United States Patent [19]
MacGillis

[11] 3,785,090
[45] Jan. 15, 1974

[54] METAL WINDOW CONSTRUCTION WITH CLAMPED CORNER JOINTS

[76] Inventor: Donald J. MacGillis, 1821 Old Ranch Rd., Los Angeles, Calif. 90049

[22] Filed: Mar. 20, 1972

[21] Appl. No.: 236,027

[52] U.S. Cl.................. 49/425, 52/657, 287/189.36
[51] Int. Cl............................................. E05d 13/02
[58] Field of Search ................ 49/425; 52/207, 657; 287/189.36

[56] References Cited
UNITED STATES PATENTS

| | | | |
|---|---|---|---|
| 3,302,351 | 2/1967 | Trulaske | 287/189.36 H X |
| 2,918,708 | 12/1959 | Sharp et al | 287/189.36 H X |
| 2,918,153 | 12/1959 | Hammitt et al | 287/189.36 H X |
| 2,788,097 | 4/1957 | Frick | 49/425 X |
| 2,668,318 | 2/1954 | Le Bon | 49/425 X |

FOREIGN PATENTS OR APPLICATIONS
1,805,415   5/1970   Germany .................. 287/189.36 H

*Primary Examiner*—Kenneth Downey
*Attorney*—Lynn H. Latta

[57] ABSTRACT

A metal window structure including frame and vent (sash) members with unwelded corner joints embodying corner brackets of dihedral L-form, secured by screw and clamping attachments of frame and vent bars. In the corner joint of a sliding vent the clamping structure includes a mounting for rollers which locates the rollers in the extreme corners of the vent. Clamping force, applied by screws on axes 90° apart, with a camming action against ramps on the sash bars, draws mitred ends of the bars together under compression to rigidify the corner.

10 Claims, 10 Drawing Figures

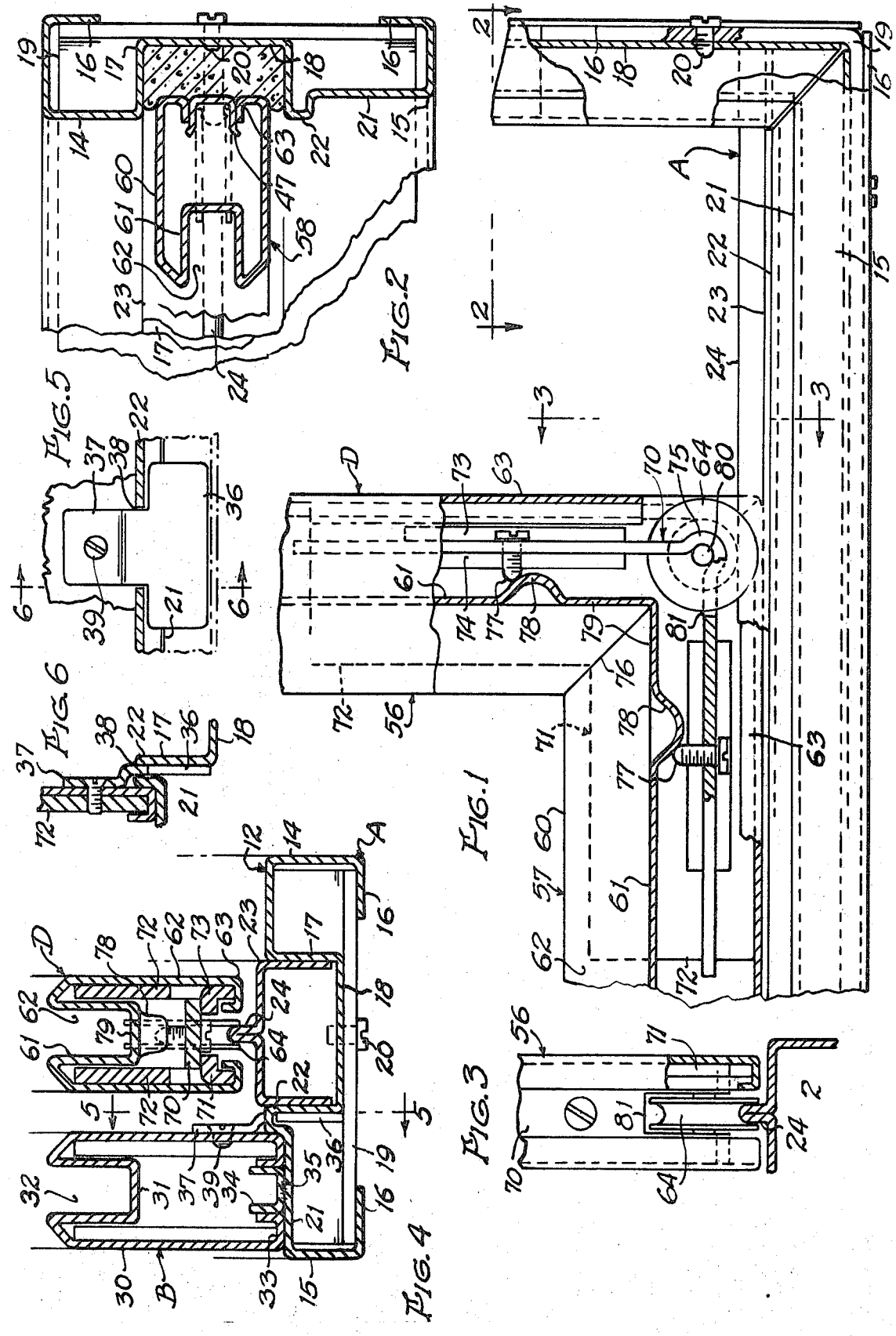

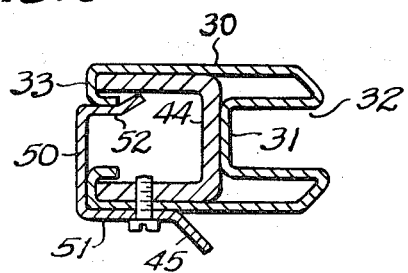
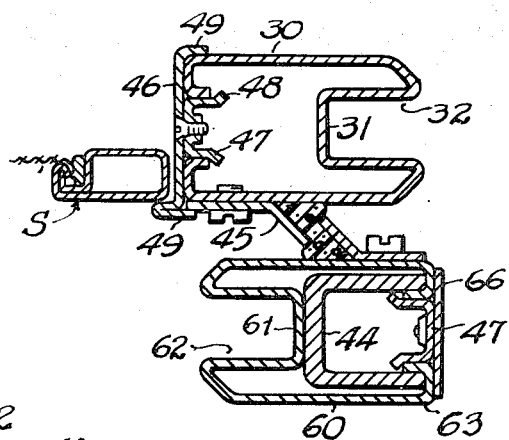
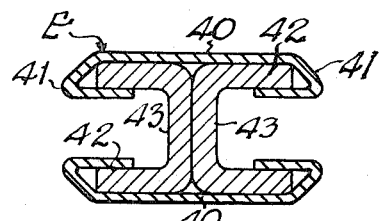
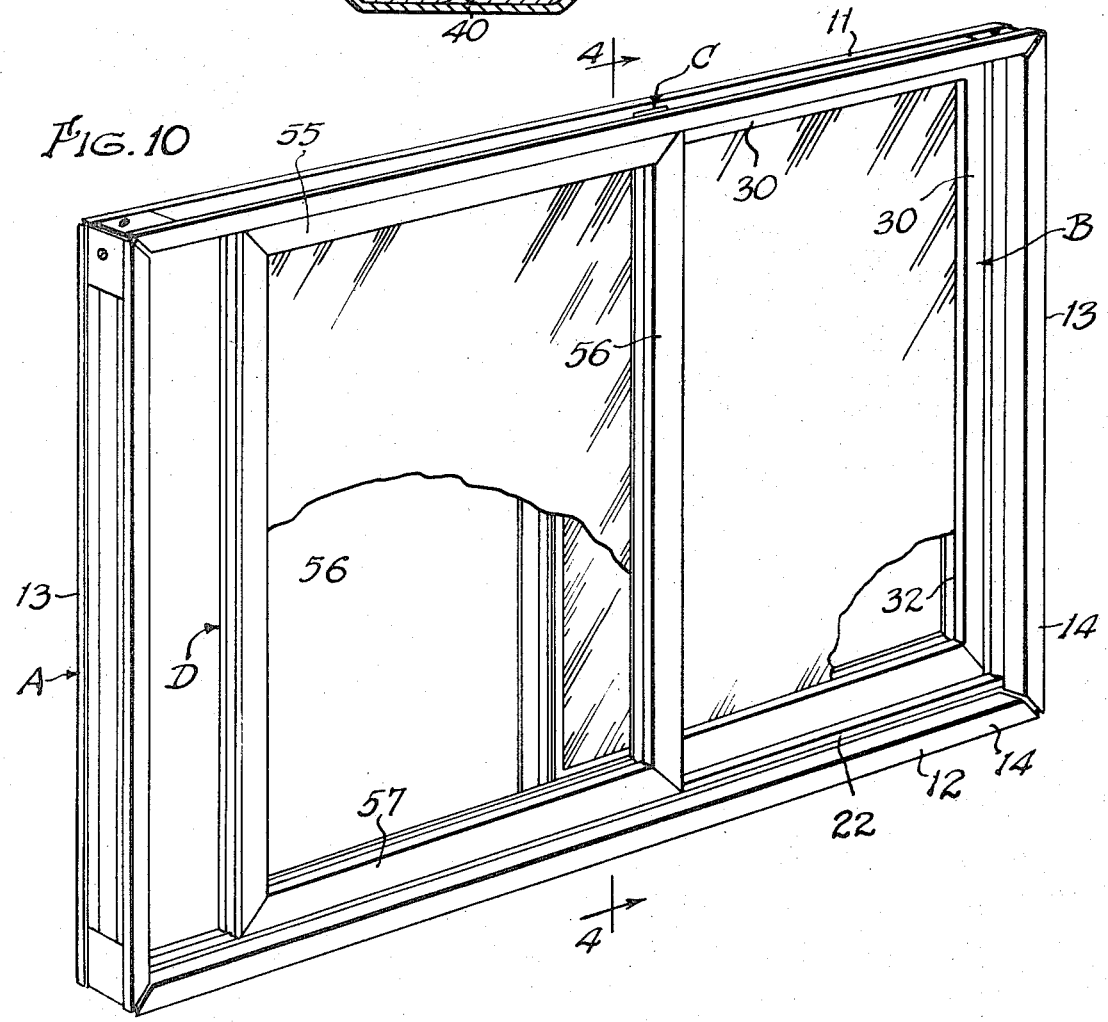

METAL WINDOW CONSTRUCTION WITH CLAMPED CORNER JOINTS

Currently it is the practice, in metal window frame and vent construction, to weld abutting ends of frame and vent bars together in corner joints, especially in structures of steel material. Welding tends to distort the structures through expansion and contraction (with consequent warping and twisting) during and after welding, and hence it is extremely difficult to achieve perfect flatness and rectilinear form in the finished product. Also, it is difficult to meet the rigid requirements of fire regulations, as applied to fire windows, for resisting deformation and failure under the heat of a fire. Furthermore, welding procedures are time-consuming and expensive as well as dependent on the welder's skill for the only partially uniform degree of form accuracy that it is possible to attain in welded structures.

Bolted, riveted and screw-fastened joints are also utilized in metal window construction, although only to a minor extent in corner joints, which must necessarily be strong and rigid. Where abutting bar elements are joined either by welding or by screws, rivets or bolts, a considerably amount of fitting by sawing, notching and filing is normally found necessary in what in effect amounts to a job shop operation.

In the prior patented art, corner L-brackets are disclosed in U.S. Pat. Nos. 2,844,233; 2,253,847, and 3,510,985, the latter also disclosing the use of the L-bracket to mount a roller. U.S. Pat. No. 2,844,233 discloses screws operating through bracket legs to apply pressure to adjoining ends of frame bars, but without camming action. U.S. Pat. No. 2,538,138 discloses the use of wedges for tightening a corner joint with a wedging action.

SUMMARY OF THE INVENTION

The invention deals with the several problems outlined above, and has as its general object to provide a metal window of improved accuracy of form and at the same time of reduced fabrication cost. To this end, the invention provides a combination of a floating dihedral-L-bracket and an embracing pair of L-shaped gusset plates abutted against and retained in outward marginal channels of adjoining frame bars, the respective arms of the floating bracket having slidable bearing engagement against integral abutment lands on the respective gussets and having respective camming screws directed inwardly on axes converging at right angles, to apply camming action against integral ramps on inward webs of the respective frame bars, so as to develop force components along the longitudinal axes of the bars, to press their ends tightly together under high compression adequate to rigidy the corner joint without setting up any warping or twisting strains. The elbow of the floating bracket also provides a mounting for a roller in the extreme corner of the joint, and the bracket automatically adjusts itself (by sliding of its arms against the gusset (lands) to a position in which the roller is correctly located in the joint. The frame bars each have a channel cross section embodying marginal abutment channels opposed to a reentrant medial web to provide for the opposed camming pressure of a screw against a web-carried ramp and the reactive pressure of the floating bracket against gusset arms retained in and abutted against respective abutment channels.

The abutting ends of the frame bars are preferably mitred for automatic sliding adjustment to correct positional relation to one another as they are pressed together by the camming action of clamp screws against ramps. Mitering can be performed readily and accurately by guillotine cutting in a supporting and positioning jig.

Specific objects of the invention are:
1. To eliminate need for cutting, sawing, notching filing, welding, and sanding of welds.
2. To attain mass production as against job shop construction;
3. To avoid wracking (distortion from rectangular outline);
4. To avoid warping or twisting due to welding;
5. To easily attain accurately the requirements for:
   a. holding glass
   b. sliding
   c. locking
   d. weathering
   e. screening
   f. application of durable finish
   g. knockdown shipping.
6. To utilize power-braked or rolled channel section material for the frame bars of both frame and vent members;
7. To take advantage of the qualities of steel over aluminum, namely, strength, adaptability to plated, plastic-coated and painted finishes, and to utilize such finishes preapplied before assembly of the frame elements; and yet to be able to substitute rolled aluminum, stainless steel or bronze, where specified, without changing assembly procedure;
8. To utilize open-channel frame elements that can be readily reinforced, where necessary, by adding slide-in channels;
9. To utilize a construction in which a mullion can easily be added to a frame to divide it for holding plural glass panes;
10. To utilize a construction readily adapted for use of a simple, screw-fastened retainer Tee for securing a fixed vent into an outer frame; and to utilize such fixed vent to brace the elements of the outer frame against wracking.
11. To provide a construction adapted to withstand underwriters' furnace tests for a fire window;
12. To provide a secure mounting for a bearing roller at the extreme end of the bottom rail of a sliding vent, for accurate control of sliding, closing, locking and weathering.
13. To provide an easily disassembled glass holding frame, to facilitate replacement of a broken pane without the need for using special tools or equipment;
14. To provide an outer frame construction readily adaptable to the addition of sections for a wide scope of applications.

These and other objects will become apparent in the ensuing description, coupled with the accompanying drawings, in which:

FIG. 1 is a fragmentary view, partly in elevation and partly in section, of a window with sliding vent, embodying the invention;

FIG. 2 is a horizontal sectional view thereof, taken on line 2—2 of FIG. 1;

FIG. 3 is a fragmentary vertical sectional view of the outer frame, taken on line 3—3 of FIG. 1, showing the sliding vent in elevation, partially broken away;

FIG. 4 is a vertical sectional view through sliding vent, fixed vent and outer frame in a medial area of the assembly leftward of that depicted in FIG. 1 and indicated by line 4—4 of FIG. 10;

FIG. 5 is a detailed view of the fixed vent fastener Tee viewed as indicated by line 5—5 of FIG. 4;

FIG. 6 is a cross-sectional view of the Tee and associated parts, taken on line 6—6 of FIG. 5;

FIG. 7 is a horizontal sectional view of adjoining elements of fixed and sliding vents in the medial area of the assembly, with the sliding vent in closed position, sealed to the fixed vent;

FIG. 8 is a cross-sectional view of a modified form of vent element (glass frame bar);

FIG. 9 is a cross-sectional view of a mullion element of another modified form of frame structure; and FIG. 10 is a perspective view of a sliding window assembly embodying the invention.

DESCRIPTION

Referring now to the drawings in detail, I have shown therein, in FIG. 10, as an example of one form in which the invention can be embodied, a sliding window comprising, in general, an outer frame A; a fixed vent B secured in one side thereof by fastener Tees C at top and bottom; and a sliding vent D normally closing the other side of the frame. A mullion E for optical use to divide for plural panes, is shown in FIG. 9. A screen S (FIG. 7) may also be embodied in the assembly.

Frame A (FIG. 10) comprises an upper horizontal frame bar (head jamb) 11, a lower frame bar (sill) 12, and upright side jambs 13, each of double channel section (FIGS. 2 and 4) comprising respective marginal channels 14 and 15 each including a free marginal flange 16, and a reentrant bridging channel 17 which, with the adjoining portions of marginal channels 14, 15, defines a main channel framing the sliding vent D. Bridging channel 17 includes a medial web portion 18 (functioning as a land) parallel to the common plane of flanges 16 and spaced therefrom a distance substantially equal to the plate thickness of a dihedral angle bracket 19 of L form which provides a rigid connection between adjoining ends of the frame bars 11, 12 and 13 at each of the four corners of frame A. The respective arms of bracket 19 are inserted into the ends of adjoining frame bars, with the side portions of each arm abutted snugly against the inner faces of the flanges 16 of a respective frame bar and the medial portion of the arm bearing snugly against the web 18 and secured thereto by a cap screw 20. Each bracket arm preferably has a tight fit between flanges 16 and web 18, for maximum rigidifying effect on the frame corners.

Channel 15 includes a depressed seat portion 21, joined to bridging channel 17 by a bead 22. Fixed vent B is mounted on seat 21 and positioned against bead 22 (FIG. 4). A track for sliding vent D is provided by a track channel 23 inset into the reentrant channel 17 of sill 12. Channel 23 has a folded central portion providing a longitudinal rail bead 24 on which the rollers of vent D travel.

Fixed vent B (FIGS. 10 and 4) comprises top, bottom and side bars all of channel section 30 having a web in the form of a reentrant channel 31 providing a glass-receiving slot 32. The free margins of the main channel side walls are inturned to provide reentrant flanges 33 which are in snug embracing engagement with a positioning strip 34 of channel section secured to frame seat 21 at 35 by welding, riveting, or equivalent means. Fixed vent B is secured by the fastener tees C in the header 11 and bottom rail 12 of frame A, each tee including a head 36 received in the side channel 15 of a respective frame bar and fitted into the bead 22 thereof, and a stem portion 37 extending through and fitted in an aperture 38 in bead 22 and attached at 39 to a respective fixed vent frame channel 30 (FIGS. 4, 5 and 6).

For a wide window vent B may include a pane-divider mullion E (FIG. 9) consisting of a pair of opposed shallow casing channels 40 each having channeled margins 41 which receive respective side legs 42 of back-to-back core channels 43, assembled by sliding them endwise into margins 41.

Each vertical side bar of vent B may be reinforced (FIG. 8) by a core channel 44 having its bridging web abutted against the reentrant glass channel 31 of the side bar and its legs extending into and seated in the channeled margins 33 of the side bar. One side bar is provided with a weather-seal strip 45 (FIG. 7) and a screen-positioning stop strip 46, secured in place by a spacer channel 47 attached to its medial area (e.g., by screws) the free margins of channel 47 being spread to provide retainer lips 48 which, in cooperation with flanges 49 on stop strip 46 embracing the margins of frame channel 30, are effective to lock the strip 46 to channel 30.

A modified form of weather seal is shown in FIG. 8. An extension 50, formed integrally with seal plate 51, is bent transversely across the gap between marginal channels 33 of the frame channel 30, and has a terminal lip 52 bent inwardly and received between the side walls of channel 30.

The frame bars of fixed vent B may be secured together at their ends in corner structure similar to that embodied in sliding vent D (hereinafter described) except for the omission of rollers.

Sliding vent D (FIGS. 1, 2, 3 and 4) embodies four frame bars (top bar 55, slide bars 56 and bottom bar 57) of channel section 58 (FIG. 2) the same as channel section 30 of the fixed vent, except that bottom bar 57 is of less height than the bottom bar of vent B. The channel section 58 of each of the bars 55, 56, 57 (FIG. 2) embodies a main channel 60, a reentrant bridging channel 61 joining the side walls of channel 60 and defining a glass-receiving slot 62, and a pair of laterally opposed inturned marginal channels 63 which are separated by a longitudinal space in which rollers 64 are exposed for tracking on the rail bead 24 of track channel 23. As in vent B, the frame bars 55, 56, are preferably closed by spacer channels 47 (FIG. 7) which may be secured by cross bars or plates 66 attached thereto by screws or equivalent fasteners, and cooperating with a rigid insert channel 44 to brace the free margins of channel 60 against either spreading or collapsing.

Referring now to FIG. 1, the clamp-tightened and rigified corner construction of the slidable vent D utilizes a dihedral L-bracket 70 which is floatingly mounted with its respective arms slidingly bearing against pairs of laterally opposed gussets 71 bearing against the adjoining end portions of frame bars 56, 57, each gusset comprising a body plate of L-form having respective flat arm 72 disposed in a common plane and projecting integrally from its apex or corner portion on a respective side of roller 64. The flat bodies of gussets 71 are disposed adjacent the lateral walls of channel 60 and extend into the spaces between those walls and bridging channel 62, being thus retained against lateral displacement. The outer margins of each gusset 71 (FIG. 4) are received in and bear against respective marginal channels 63 of channel 60. Gussets 71 have integral bearing lands 73, struck laterally inwardly out of slots 74 in respective gusset arms 72 and providing bearing faces in a common plane, against which the respective arms of dihedral bracket 70 bear for free sliding movement to provide a floating mounting for bracket 70 in which its apex portion 75 remains centered on the 45° diagonal bisector plane of the frame corner defined by adjoining bars 56, 57. The ends of the channels 60 constituting these bars are mitred on a 45° bias at 76 so as to meet in said bisector plane, and are clamped in compressive engagement with one another by camming action of screws 77 against ramps 78 on the adjoining frame bars 56 and 57 respectively.

Ramps 78 are formed integrally in bridging webs 79 of bridging channels 61. Screws 77 are threaded through respective arms of floating bracket 70 and engage against inclined ramp surfaces on the sides of the ramps 78 remote from one another. Thus the camming action of screws 77, advanced on inwardly converging axes, is effective to urge the frame bars 56, 57 toward the plane 76 of engagement of their mitred ends, and to establish compressive engagement of the mitred end accompanied by reactive compressive seating of the outer faces of the dihedral arms of floating bracket 70 against lands 73, this reactive pressure being transferred to and through gussets 71 to marginal channels 63 of frame bar channels 60. The opposing forces generated by screws 77 are exerted in opposite directions against channels 61 and gussets 71 respectively, and are contained by the opposed channel elements 61 and 63 of the respective frame bars 56, 57, while the bracket 70 floats along the 45° bisector plane of the frame corner during an assembly operation, coming to rest at a position where its respective arms are tightly held against the lands 73 by the reactive push of screws 77. Thus all elements of the corner structure are securely clamped and braced in a rigid assembly which effectively resists wracking of the vent frame and thus maintains a true rectangular form in the frame.

Although not all shown in detail, it is to be understood that all four corners of each vent frame (of both vents B and D) may be and preferably are of the construction just described, with the exception that in the two lower corners of sliding vent D the apex portions of the floating brackets 70 in the two lower corners of sliding vent D are each bifurcated and in the form of laterally spaced open loops 75 holding the ends of a respective stub shaft 80 on which a roller 64 is journalled in a slot 81 (FIG. 3) in bracket 70. Loops 75 project toward the apex extremity of the frame corner and locate the roller 64 in the extreme corner, the two rollers being thus positioned with maximum separation and hence providing a support base of maximum breadth and resistance to tipping when a push is applied to the vent to slide it between open and closed positions.

Rollers 64 roll on track beads 24 of track channel 24. The latter can be simply set into the bridging channel 17 of base rail 12 of outer frame A and held by a moderate frictional fit therein, plus the weighting effect of sliding vent D resting thereon.

By way of summary, it may be noted that the invention provides an assembly in which all parts can be secured by mechanical fasteners such as screws, without the need for welding, thus avoiding warping and twisting, and also provides means for rigidifying corner structures in truly rectangular frames adequately resisting any wracking forces that may be imposed on the members.

I claim:

1. In a metal window structure, in combination:
   an outer frame including a bottom sill having a track rail extending longitudinally;
   a fixed vent frame mounted in said outer frame;
   and a sliding vent frame including rollers at its lower corners, said rollers engaging said rail for rolling movement thereon;
   at least one of said frames including a horizontal bottom bar and vertical side bars extending upwardly therefrom;
   said bottom bar and side bars having a cross-section including a main channel and inturned marginal channels extending along respective sides of said main channel;
   said bottom side bars having mitered ends abutting one another; and means joining said abutting ends, said joining means each comprising a dihedral right-angular L-bracket having respective arms extending longitudinally into the adjoining mitered end portions of said bottom bar and a respective side bar;
   said frame bar cross-section including opposed spaced side walls and a bridging web in said main channel, said marginal channels being in opposed relation to said bridging web;
   said joining means each further including reinforcing gussets having side marginal portions abutting and retained in said marginal channels of said adjoining end portions of said bottom bar and the respective side bar and providing bearing surfaces against which the respective arms of said L-bracket are slidably abutted for floating movements of said L-bracket relative to said adjoining end portions;
   clamp screws threaded through the respective arms of said L-bracket and directed inwardly relative to the respective frame corner;
   and ramps in said adjoining end portions of the frame bars, the inner ends of said clamp screws engaging remote areas of said ramps with a camming action such as to draw said end portions into abutting engagement when the screws are advanced;
   said dihedral L-brackets having floating reactive engagement against said gusset bearing surfaces during tightening of said screws.

2. A metal window structure as defined in claim 1, said frame bar cross-section including a glass-mounting reentrant channel provided in said bridging web, the sides of said reentrant channel being in laterally-opposed, spaced relation to said side walls, said gussets being embraced and retained between said sides and said side walls.

3. A metal window structure as defined in claim 1; wherein said reinforcing gussets comprise a pair of gussets of L-form each embodying co-planar flat arms in face-to-face engagement with the inner face of respective laterally opposed side walls of the main channel portions of both of said adjoining end portions and with their outer margins seated in said marginal channels;

and integral bearing lands struck from the arms of the respective gussets in opposed pairs extending toward one another in common planes to provide said bearing surfaces for said floating movements of said L-bracket.

4. A metal window construction as defined in claim 2:

said reentrant channel including a bridging web in which the respective ramp is formed as an integral outward protrusion in each of said adjoining frame end portions.

5. A metal window construction as defined in claim 1, said one frame being the sliding vent frame;

said rollers being journalled on respective corner portions of respective L-brackets.

6. A metal window structure as defined in claim 1, said outer frame having a cross-section including a reentrant medial channel forming a part of said main channel;

said marginal channels being in opposed relation and including free marginal flanges disposed in a common plane;

said reentrant channel having a bridging web spaced inwardly from said common plane;

said L-bracket arms having their side marginal portions received respectively in said marginal channels and their medial portions abutted against said bridging web;

and fastener means attaching said medial portions to said bridging web.

7. A metal window structure as defined in claim 1, said outer frame having a cross-section including a reentrant medial channel forming a part of said main channel;

said bottom rail including a track channel inserted into said reentrant medial channel and having a medial top portion including an upwardly projecting folded central bead constituting said track rail.

8. A metal window structure as defined in claim 1, said outer frame having a cross-section including a reentrant medial channel forming a part of said main channel;

one of said marginal channels of said sill including a depressed seat portion and a raised bead joining the same to said reentrant channel;

said fixed vent frame including a bottom bar of channel section including a main channel having spaced side walls, a reentrant channel bridging between the upper margins of said side walls and defining a glass-receiving slot, and inturned, upwardly-opening marginal channels at the lower margins of said side walls;

said marginal channels being seated on said depressed seat portion and one of them positioned against said raised bead;

a fastener tee including vertical stem projecting through a slot in said raised bead and detachably secured to the side wall of said bottom bar adjacent said rasied bead, and a horizontal head engaged within said raised bead in its under side.

9. A window structure as defined in claim 8:

said marginal channels of said fixed vent bottom bar defining a longitudinal space between them;

and a positioning strip of channel section in said longitudinal space and engaged between said marginal channels, said positioning strip having a bridging web secured to said depressed seat of the outer frame.

10. A metal window structure as defined in claim 1:

said gussets each having a body plate of L-form comprising respective arms each disposed adjacent the inner face of a respective side wall of the main channel of a respective frame bar and having an outer edge received in and abutting a respective marginal channel thereof, each pair of gussets further including respective bearing lands projecting laterally toward one another from respective body plates in opposed relation in a common plane;

said dihedral L-bracket arms being in floating bearing engagement with respective lands.

* * * * *